United States Patent [19]

Bretschneider et al.

[11] Patent Number: 6,128,629

[45] Date of Patent: Oct. 3, 2000

[54] METHOD AND APPARATUS FOR AUTOMATICALLY UPDATING DATA FILES IN A SLIDE PRESENTATION PROGRAM

[75] Inventors: Richard Bretschneider, San Jose; Burton Siu, Redwood Shores; Imran Iqbal Qureshi, Sunnyvale, all of Calif.

[73] Assignee: Microsoft Corporation, Redmond, Wash.

[21] Appl. No.: 09/479,528

[22] Filed: Jan. 7, 2000

Related U.S. Application Data

[63] Continuation of application No. 08/970,216, Nov. 14, 1997, Pat. No. 6,041,333.

[51] Int. Cl.$^7$ ....................................................... G06F 12/00
[52] U.S. Cl. ........................... 707/203; 707/104; 707/513; 707/517
[58] Field of Search ..................................... 707/104, 203, 707/513, 517; 345/339

[56] References Cited

U.S. PATENT DOCUMENTS

| | | | |
|---|---|---|---|
| 5,075,847 | 12/1991 | Fromme | 395/705 |
| 5,155,847 | 10/1992 | Kirouac | 709/221 |
| 5,212,789 | 5/1993 | Rago | 707/1 |
| 5,781,190 | 7/1998 | Gorbet | 345/335 |
| 5,809,287 | 9/1998 | Stupek | 395/500.43 |
| 5,845,077 | 12/1998 | Fawcett | 395/200.51 |
| 5,859,623 | 1/1999 | Meyn | 345/1 |
| 5,889,990 | 3/1999 | Breternitz | 395/709 |
| 5,956,737 | 3/2000 | King et al. | 707/517 |
| 6,041,303 | 3/2000 | Mathews | 705/1 |

OTHER PUBLICATIONS

*Delta Graph Professional, For Macintosh*, Delta Point, Inc., Monterey, California, 1989. Chapter 13. pp. 13–1 to 13–26.
*Microsoft PowerPoint for Windows 95, Step by Step*, Microsoft Press, Redmond, Washington, 1995. "Getting Ready"; Lessons 1, 2, 12, and 13; Appendix B. pp. 1–274.

*Primary Examiner*—Thomas G. Black
*Assistant Examiner*—Diane D. Mizrahi
*Attorney, Agent, or Firm*—Christensen O'Connor Johnson & Kindness PLLC

[57] ABSTRACT

A computer-based system and method of updating and viewing an electronic slide show presentation is disclosed. The method includes storing a local version of the slide presentation file and an indication of the most recent update to the slide presentation. When a user launches the local slide presentation, the date of the most recent update to the slide presentation is retrieved, and used to determine whether a new update is advisable. A dialog window queries the user as to whether to perform an update of the slide presentation. If the user responds affirmatively, the slide presentation program automatically retrieves a version of the slide presentation from a remote computer on a network. After updating the local version of the an slide presentation file, an electronic slide show is automatically launched utilizing the remote version retrieved from the network.

10 Claims, 7 Drawing Sheets

METHOD AND APPARATUS FOR AUTOMATICALLY UPDATING DATA FILES IN A SLIDE PRESENTATION PROGRAM

CROSS-REFERENCE TO RELATED APPLICATION

This application is a continuation of prior U.S. patent application Ser. No. 08/970,216, filed Nov. 14, 1997, now U.S. Pat. No. 6,041,333.

FIELD OF THE INVENTION

The present invention relates to the field of computer software and, in particular, to methods and systems for updating data files used by application programs.

BACKGROUND OF THE INVENTION

Computer programs often have associated data files that are processed by the computer program during a normal execution of the computer program. A data file can contain information that is processed and presented to a user either in a video presentation or an audio presentation, or a combination of video and audio. Slide presentation programs are examples of computer programs that process an associated data file.

Slide presentation programs are computer programs that enable a user to create, edit, manage, and perform "presentations" on a computer. One example of a popular slide presentation program is Microsoft PowerPoint, available from Microsoft Corporation, of Redmond, Washington. A slide presentation includes a set of electronic "slides," each slide corresponding to one screen or page of output. An electronic slide may also be converted to a 35 mm or overhead transparency and displayed in a standard slide projector or overhead projector. Each slide contains one or more objects, such as text, graphical images, or graphic automation. A slide may also include a sound object or video that is played when the slide is displayed during a "slide show" performance.

A slide presentation program "performs" a slide show by sequentially displaying a series of slides contained within the slide presentation. The slides are displayed on a computer screen or projected onto a separate surface. During a performance of a slide show, a "presenter" controls the performance by invoking commands to "advance" to the next slide. A command can be entered using a keyboard, a mouse, or another suitable input device. Alternatively, an author of a slide presentation can include slide "timings" with each slide. A slide timing corresponding to a slide indicates the number of seconds that the slide is displayed before the slide presentation program automatically advances to the next slide. During a performance of a slide show, a slide presentation program automatically advances to the next slide when the existing slide's timing ends. An ordered sequence of slides is predetermined by a slide presentation author. During a performance of a slide show, a presenter can enter commands to alter the sequence of slides.

The PowerPoint program has associated sample presentation files, each sample presentation file including an example of a slide show that can be created with Power-Point. Sample presentation files are distributed on a storage medium that also contains the PowerPoint Program, as part of the PowerPoint product. Since there is limited space available on the storage medium that is distributed, the number and size of sample presentations that can economically be distributed in this manner is limited. Additionally, all sample presentations that are to be distributed in this manner must be available prior to the date of product manufacturing in order to be included on the storage medium in the finished product.

It is desirable to have a mechanism that allows an application program, such as a slide presentation program, to update the set of data files associated with the application program. Preferably, such a mechanism will retrieve data files from a network, such as the Internet. Additionally, a preferable mechanism will automatically determine whether an update of the data file set is advisable, based upon the duration since a previous update. Further, a preferable mechanism will automatically retrieve updated data files and begin a slide show.

SUMMARY OF THE INVENTION

In accordance with this invention, a system and computer-based method of updating and viewing an electronic slide show presentation is disclosed. The method includes storing a local version of the slide presentation file and an indication of the most recent update to the slide presentation. When a user launches the local slide presentation, the date of the most recent update to the slide presentation is retrieved, and used to determine whether a new update is advisable. Based on this determination, a remote slide presentation file is selectively retrieved from a remote computer. Either the local slide presentation or a new copy of the remote slide presentation file is automatically launched and displayed to the user.

In accordance with other aspects of this invention, if a new update is advisable, the user is queried for whether to perform an update of the local slide presentation file. Upon receiving a response from the user, if the user's response is negative, the remote slide presentation program file is not retrieved.

In accordance with still other aspects of this invention, a computer program locates the local slide presentation file by using local program file reference data that refers to the file location. Retrieval of the remote slide presentation file includes storing a copy of the remote program file in a location referenced by the local program file reference data. Preferably, the location of the copy of the remote program file has the same physical or logical address as the local program file.

In accordance with yet still other aspects of this invention, when a remote program file is retrieved, the retrieval date is stored. When the mechanism of the invention determines whether an update of the local program file is advisable, the date of the previous remote program file is retrieved. If the length of time since the previous remote program file retrieval exceeds a predetermined length of time, then an update of the local program file is advisable.

In accordance with further aspects of this invention, the local program file is stored on a computer storage medium associated with a local computer, and the local computer communicates with the remote computer over a network. The network can be a local area network or a wide area network, such as the Internet.

As will be readily appreciated from the foregoing description, a method of updating and viewing an electronic slide show presentation formed in accordance with the invention provides a way of allowing a user to access information that is stored on a remote computer without requiring that the remote computer be accessed every time that the user desires to view the information. The invention allows the user to access a local copy of the information when the local copy has been recently updated, or when the user does not wish to retrieve a remote copy. The user has the benefit of being able to access the local information when desired, while an information supplier has the opportunity to add updated information for access by the user. This allows a supplier to provide information and accessories to a user, where the information and accessories are not available at the time of preparing the software product. It also reduces the amount of space on the product storage medium that is required to store all information when a product transaction occurs.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention provides a mechanism for automatically updating a computer data file associated with an application program and, in particular, an electronic slide presentation file associated with slide presentation software. The mechanism of the invention receives a command to "launch" an electronic slide show and automatically determines whether updating of the desired electronic slide show data file is desirable. If updating is desirable, the mechanism of the invention retrieves a new version of the electronic slide show data file and automatically launches an electronic slide show utilizing the new data file.

Figure 1:
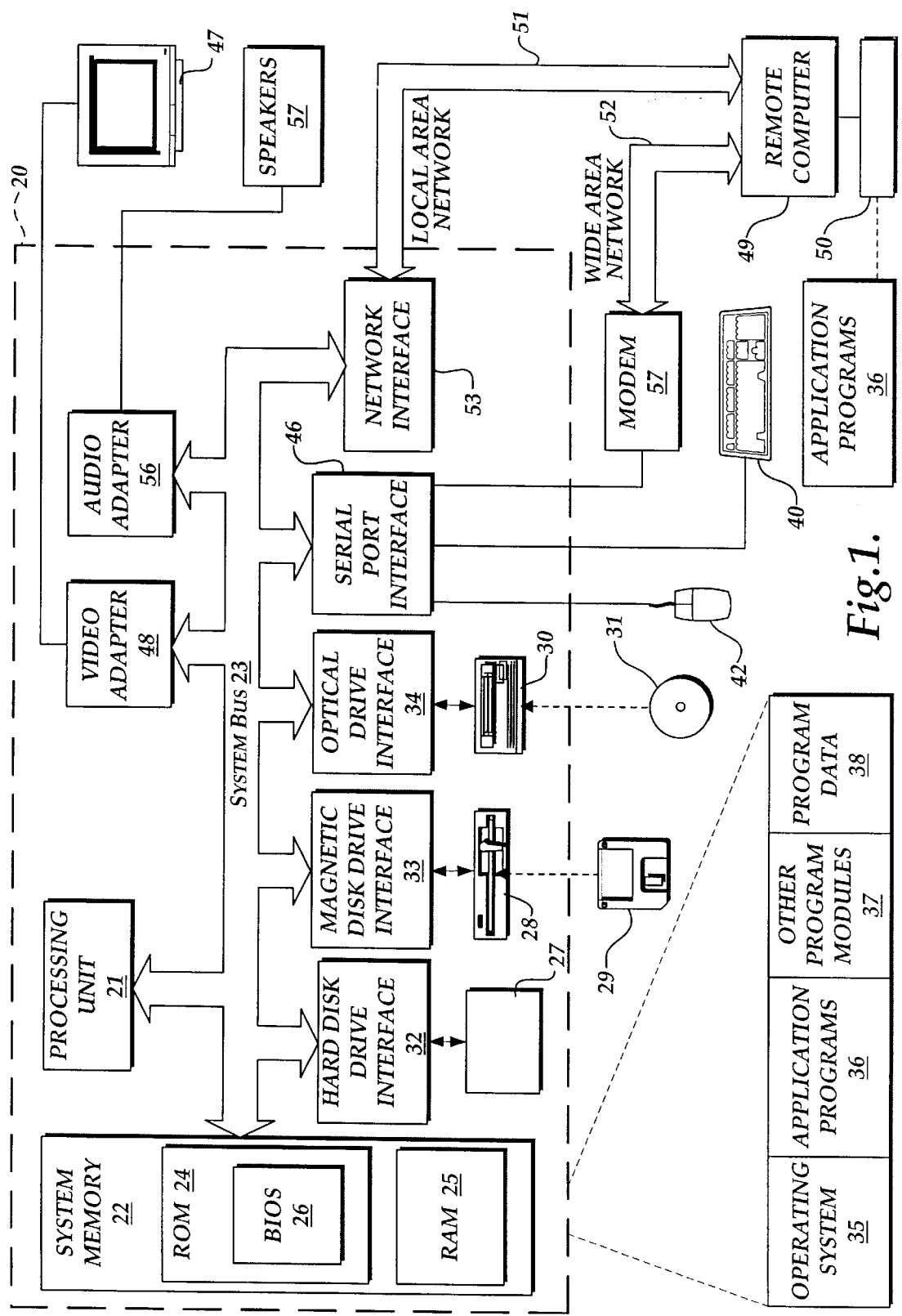
FIG. 1 is a block diagram of a general purpose computer system for implementing the present invention.

In accordance with the present invention, a slide presentation program executes on a computer, preferably a general purpose personal computer. FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer-readable media which can store data that is accessible by a computer, such as magnetic cassettes, flash memory cards, digital versatile disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, a small computer system interface (SCSI) port, game port, Apple desktop bus (ADB) or a universal serial bus (USB). A monitor 47 or other type of display device is also connected to the system bus 23 via an interface, such as a video adapter 48. One or more speakers 57 may also be connected to the system bus 23 via an interface, such as an audio adapter 56. In addition to the monitor and speakers, personal computers typically include other peripheral output devices (not shown), such as printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52, Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Figure 2:
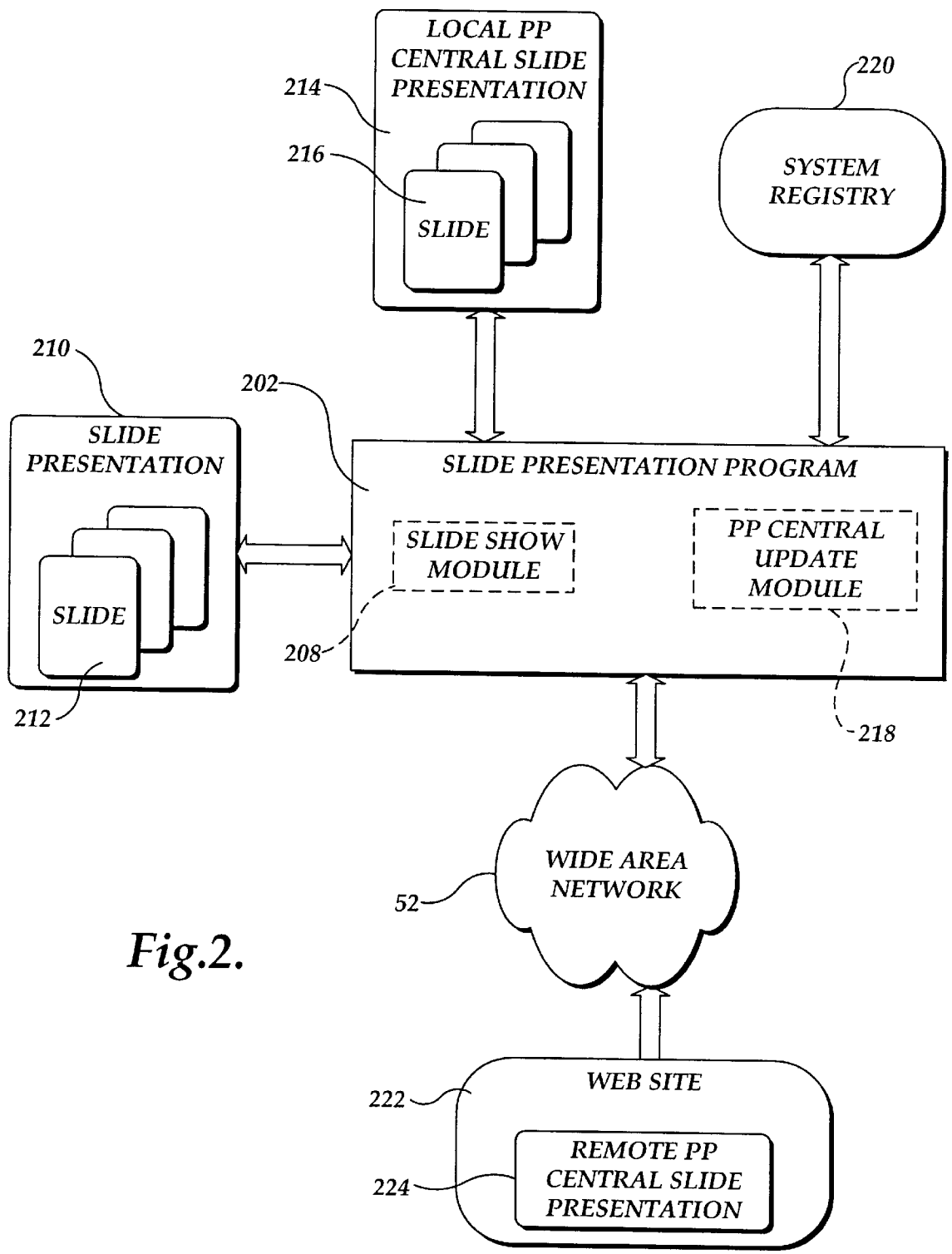
FIG. 2 is a block diagram illustrating an architecture of a slide presentation program, in accordance with the present invention.

FIG. 2 illustrates an architecture of a slide presentation program 202 in accordance with the present invention. A slide presentation program 202 provides an author with the ability to create and edit a set of one or more "slides" 212 and to "present" or display one or more of the set of slides. The set of slides is referred to as a "slide presentation" 210. A slide presentation 210 is generally stored on a computer storage medium, such as a disk drive. The computer storage medium may be directly connected to the computer that performs a side show, or it may be connected to a remote computer on a local area network (LAN) or a wide area network (WAN), such as the Internet. A slide is a discreet collection of information, including visual information such as text, graphic images, video, or animation. A slide may also comprise other information, including sounds and interactive information, such as hyperlinks.

The slide presentation program 202 includes a slide show module 208 that contains program code for controlling an electronic slide show. During an electronic slide show, the slide show module 208 retrieves a slide 212 and displays the slide on an output medium, such as a display monitor (FIG. 1). Since a slide can contain multimedia data, displaying a slide includes playing audio or video data, as well as visually displaying the contents of the slide. Specifically, displaying a slide includes displaying the text and graphics contained within the slide, which may include animation, and playing a "sound clip," if any, embedded in the slide. A sound clip is a block of data representing sound, and can be stored in one of a plurality of storage formats, such as WAVE, Musical Instrument Digital Interface (MIDI), or the Audio Interchange File Format (AIFF).

The slide show module 208 provides several options for presenting an electronic slide show. The slide show module may automatically display a predetermined sequence of slides 212, displaying each slide for a corresponding predetermined amount of time. Alternatively, the slide show module 208 may display each slide 212 in a predetermined sequence of slides, pausing after displaying each slide until a user performs an operation instructing the slide show module to "advance" by retrieving and displaying the next slide in the sequence of slides. The slide show module 208 also provides the ability for a user to present slides in a sequence that is not predetermined, by specifying the number or name of a slide 212 within the slide presentation 210. A slide 212 may also have "links" built into it by a slide author using a slide creation module (not shown). The link includes a visual area on the slide and a corresponding address of a target slide. When a user selects the link area on the slide, the slide show module 208 automatically retrieves and displays a designated target slide. The target slide may be a slide within the same slide presentation 210 as the current slide, or it may be a slide in a different slide presentation. If the target slide is in a different slide presentation, the target slide presentation may be located on a remote computer accessible over a wide area network, such as the Internet. If the target slide presentation is accessible over the Internet, the link address may include a Universal Resource Locator (URL) or an address specified with another Internet protocol, such as the file transfer protocol (FTP). A link may also refer to a resource on a local storage medium, such as a CD-ROM drive. Target resources may include clip art, videos, sound clips, graphic effects, templates, text files, spreadsheets, documents, or database macros.

FIG. 2 includes a slide presentation referred to as the local PPCentral slide presentation 214. The local PPCentral slide presentation 214 comprises a sequence of slides 216, and is distinguished by the content of the slides 216. The slides may include informative articles, advice on the use of an application program, samples of slide presentations that can be created with the slide presentation program, or links to additional information. The slide presentation thereby can function as documentation or as a multimedia electronic magazine.

The slide presentation program 202 also includes a PPCentral update module 218 that controls updating of the local PPCentral slide presentation 214. As described in further detail below, the PPCentral update module 218 is automatically invoked when a request is made to display the local PPCentral slide presentation 214. The PPCentral update module 218 determines whether an update of the local PPCentral slide presentation 214 is advisable and, if so, automatically retrieves a new version of the PPCentral slide presentation.

The PPCentral update module illustrated in FIG. 2 communicates with a system registry 220. The system registry 220 operates as a database of information pertaining to application programs that execute on the personal computer 20 (FIG. 1). Windows 95 provides a system registry that is employed by application programs to store configuration information for subsequent retrieval. The slide presentation program 202 stores information pertaining to the local PPCentral slide presentation 214 in the system registry 220. In particular, the slide presentation program 202 stores information representing the location of the local PPCentral slide presentation 214 and a time stamp indicating the date and time of the last update to the local PPCentral slide presentation 214. The system registry 220 may also contain data indicative of the PPCentral slide presentation version. As discussed in further detail below, the PPCentral update module 218 utilizes this information to selectively update the local PPCentral slide presentation 214. As will be understood by those skilled in the art of computer programming and others, alternative mechanisms for storing and accessing the information may be used. For example, the information described as residing in the system registry 220 may alternatively reside in one or more data structures internal to the application or in files.

In a preferred architecture, the PPCentral update module 218 is implemented as an add-in program linked to the slide presentation program 202. Microsoft PowerPoint provides the ability to link add-in programs, which are supplemental programs that extend the capabilities of the slide presentation program 202. The Microsoft Office 97 Visual Basic Programmers Guide, published by Microsoft Press (ISBN 1-57231-340-4), contains further information about add-in programs. As should be recognized by one skilled in the art of computer programming, and others, software that implements the functionality of the PPCentral update module 218 can be implemented in a variety of ways, including being linked as an integral part of the slide presentation program 202.

As illustrated in FIG. 1, and discussed above, the personal computer 20 is connected to a remote computer 49 by a network, such as a local area network 51 or a wide area network 52, such as the Internet. FIG. 2 illustrates one embodiment, in which the slide presentation program 202 and the PPCentral update module 218, executing on the personal computer 20, communicate over the wide area network 52 with a remote computer 49 (FIG. 1). The remote computer 49 contains, in its storage medium (not shown), a web site 222. The web site 222 comprises one or more computer files and computer programs that are transmitted over the wide area network 52 and retrieved by the personal computer 20. The operation of a remote computer 49 that contains a web site 222 is well known in the art, and is described herein only as relevant to the present invention.

The web site 222 includes a remote PPCentral slide presentation file 224. The remote PPCentral slide presentation file 224 is a version of the local PPCentral slide presentation file 214 residing on the personal computer 20. The remote PPCentral slide presentation file 224 is preferably the same version, or a later version, of the local PPCentral slide presentation file 214. The version of the remote PPCentral slide presentation file 224 may be represented as a time stamp, or another form of data that represents a version. As discussed in further detail below, the PPCentral update module 218 retrieves new versions of the remote PPCentral slide presentation file 224 to replace the local PPCentral slide presentation 214 when it determines that an update is advisable.

Figure 3:
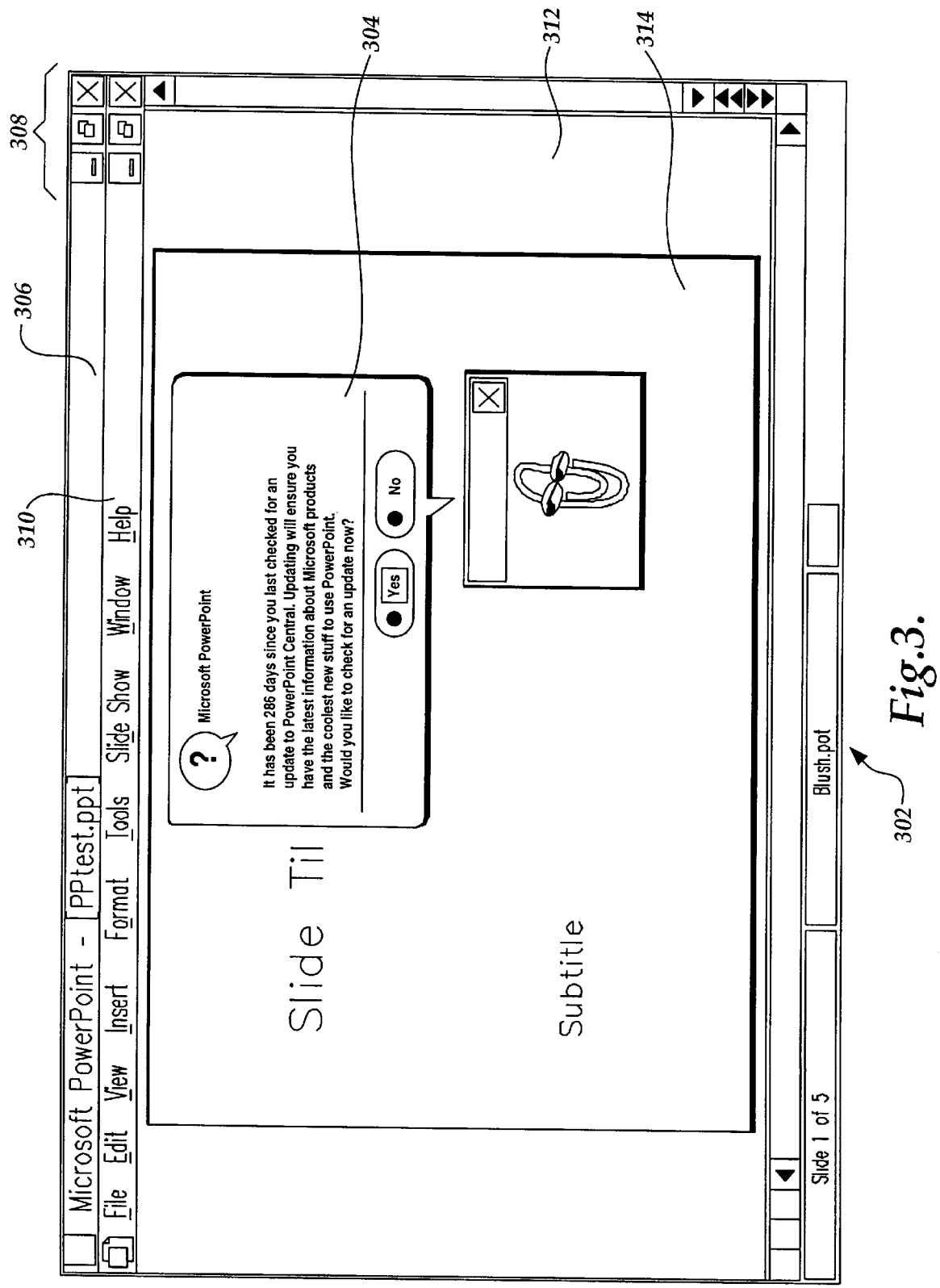
FIG. 3 illustrates an "update" dialog window that is displayed in accordance with the present invention.

FIG. 3 illustrates an exemplary slide presentation program window containing an "update" dialog window 304 that is displayed and controlled by the PPCentral update module 218 (FIG. 2) in one actual embodiment of the invention. As depicted in FIG. 3, the slide presentation program window 302 is a standard Windows 95 application window, and includes a title bar 306 having iconic controls 308 for manipulating the application window. The slide presentation program window 302 also includes a menu bar 310 that allows a user to select menu commands.

As depicted in FIG. 3, the menu bar 310 includes titles of nine menus, each menu having one or more menu commands. The menu titles are "File," "Edit," "View," "Insert," "Format," "Tools," "Slide Show," "Window," and "Help." The display area 312 of the slide presentation program window 302 contains a slide 314.

In the actual embodiment, the "Tools" menu includes a menu command labeled "PowerPoint Central." When a user selects this menu command, the PPCentral update module 218 queries the system registry 220 for the time stamp of the most recent update to the local PPCentral slide presentation 214. If a predetermined amount of time has passed since the most recent update, the PPCentral update module 218 displays the "update" dialog 304. In the actual embodiment, the "update" dialog 304 displays the length of time since the previous update, suggests that an update is advisable, and prompts the user as to whether the PPCentral update module 218 should determine whether a more recent version of the remote PPCentral slide presentation file 224 exists on the remote computer 49 (FIG. 1). As discussed in further detail below, if the user responds affirmatively to the update dialog window 304, the PPCentral update module 218 determines whether such a more recent version of the remote PPCentral slide presentation 224 exists and, if so, retrieves the more recent version, replacing the local PPCentral slide presentation 214.

Figure 4:
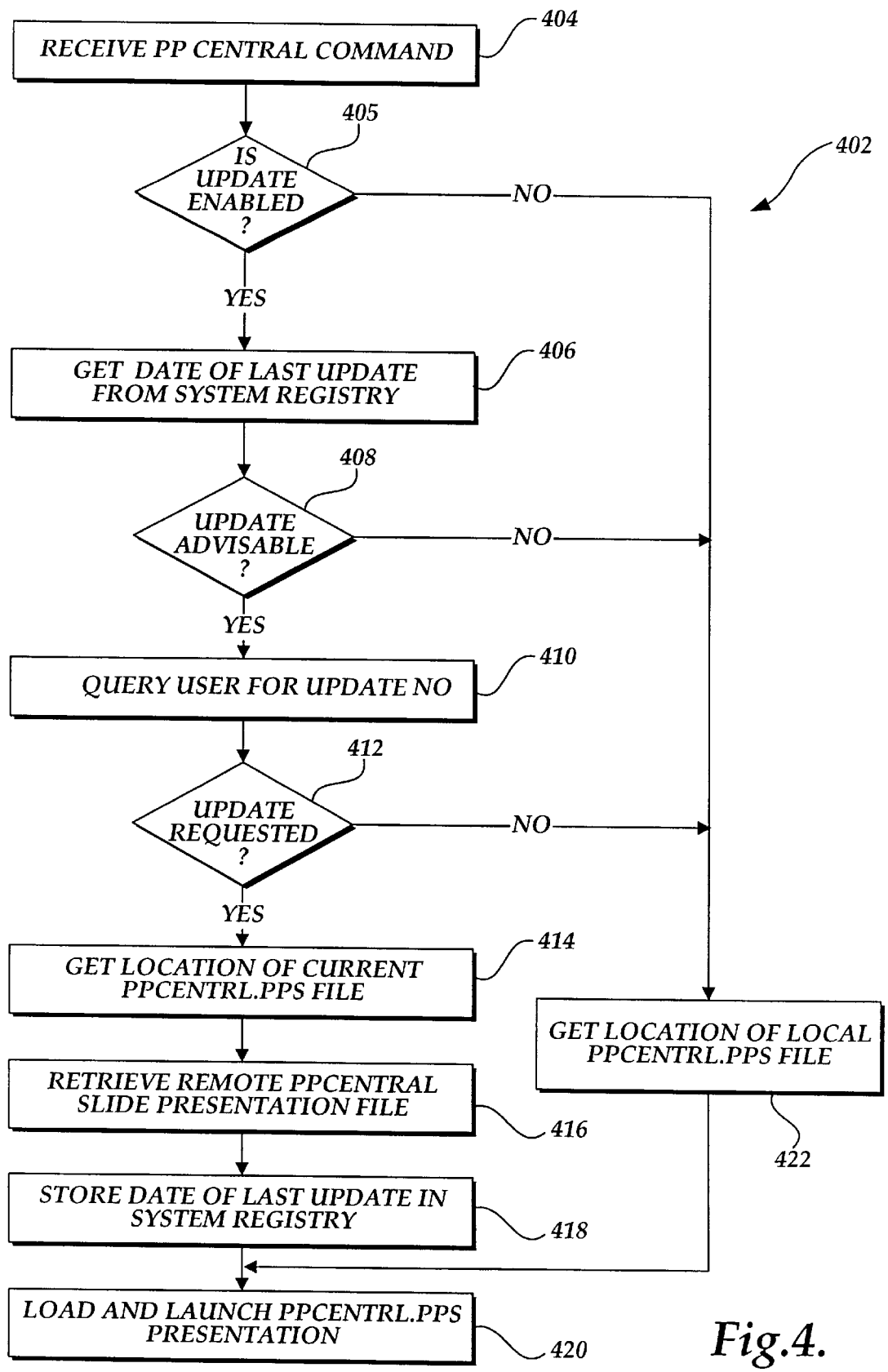
FIG. 4 is a flow diagram illustrating the process of updating and launching a PPCentral slide presentation.

FIG. 4 illustrates a process 402 of updating a local PPCentral slide presentation file 214. At step 404, the PPCentral update module 218 receives a PPCentral command, indicating that a user has selected the PowerPoint Central menu item on the "Tools" menu. At step 405, a determination is made of whether updating of the ppcentral.pps file is enabled. If not, a new file is not retrieved and flow proceeds to step 422, discussed below. If updating is enabled, flow proceeds to step 406, where the PPCentral update module 218 queries the system registry 220 and retrieves the date of the most recent update of the local PPCentral slide presentation file 214. At step 408, the PPCentral update module 218 determines whether the time that has elapsed since the most recent update exceeds a predetermined amount of time that indicates when an update is advisable. In one actual embodiment, the predetermined amount of time is ninety days. If an update is advisable, at step 410, the PPCentral update module 218 displays the "update" dialog window 304 (FIG. 3) and queries the user for whether to perform an update of the local PPCentral slide presentation file 214.

If the user responds affirmatively to the "update" dialog window 304, at step 414, the PPCentral update module 218 retrieves the location of the local PPCentral slide presentation file 214 from the system registry 220. At step 416, the PPCentral update module retrieves the remote PPCentral slide presentation file 224. Techniques of retrieving a file over a wide area network 52 or a local area network are well known to those skilled in the art of computer programming, and others, and is not discussed in further detail herein. While the remote PPCentral slide presentation file is being retrieved, the slide presentation program may display a status dialog informing the user that the file is being retrieved. At step 416, the remote PPCentral slide presentation file 224 is preferably stored in the same location as the local PPCentral slide presentation file 214. At step 418, the PPCentral update module 218 stores data representing the date of the most recent update in the system registry 220. At step 420, the slide presentation program 202 loads the newly received remote PPCentral slide presentation file 224, which replaces the local PPCentral slide presentation file 214. The slide presentation program 202 automatically launches an electronic slide show with the new local PPCentral slide presentation file 214.

If, at step 408, the PPCentral update module 218 determines that an update of the local PPCentral slide presentation file 214 is not advisable, flow proceeds to step 422, where the system registry 220 is queried for the location of the local PPCentral slide presentation file 214. Flow control then proceeds to step 420, where the slide presentation program 202 automatically loads and launches the local PPCentral slide presentation file 214, without performing an update. If, at step 412, after the user has been queried for whether to perform an update, an update is not requested, flow control proceeds to step 422, where the PPCentral update module 218 retrieves, from the system registry 220, the location of the local PPCentral slide presentation file 214. Flow control then proceeds to step 420, where the slide presentation program 202 automatically loads and launches the local PPCentral slide presentation file 214.

As will be recognized by those skilled in the art of computer programming, and others, the above-described process 402 of updating the local PPCentral slide presentation file 214 can be modified. For example, the retrieval of the location of the local PPCentral slide presentation file 214 can be performed together with the retrieval of the date of the most recent update to the local PPCentral slide presentation file 214.

Figure 5A:
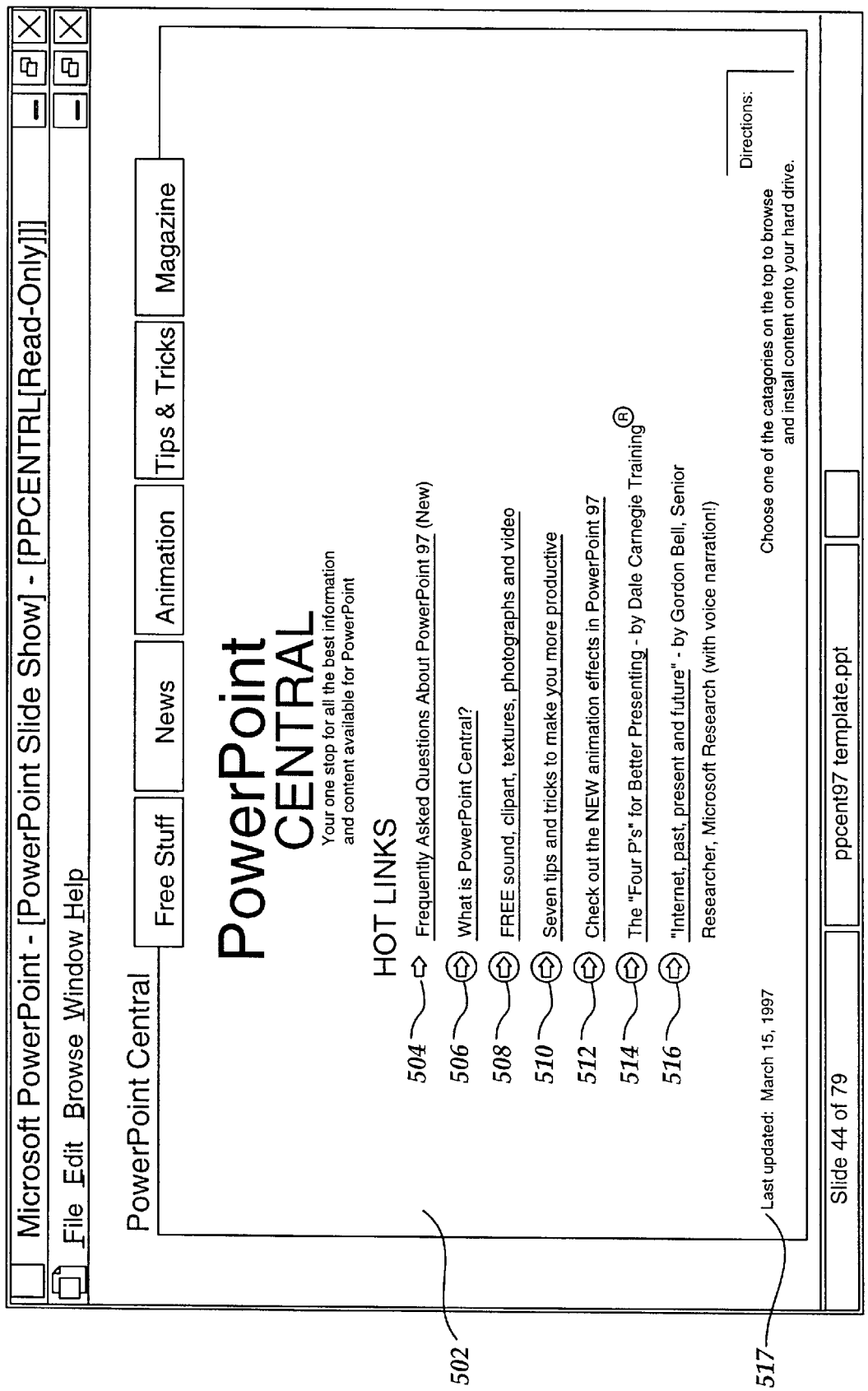
FIGS. 5A–5C illustrate slides from an exemplary slide presentation in accordance with the invention.
Figure 5B:
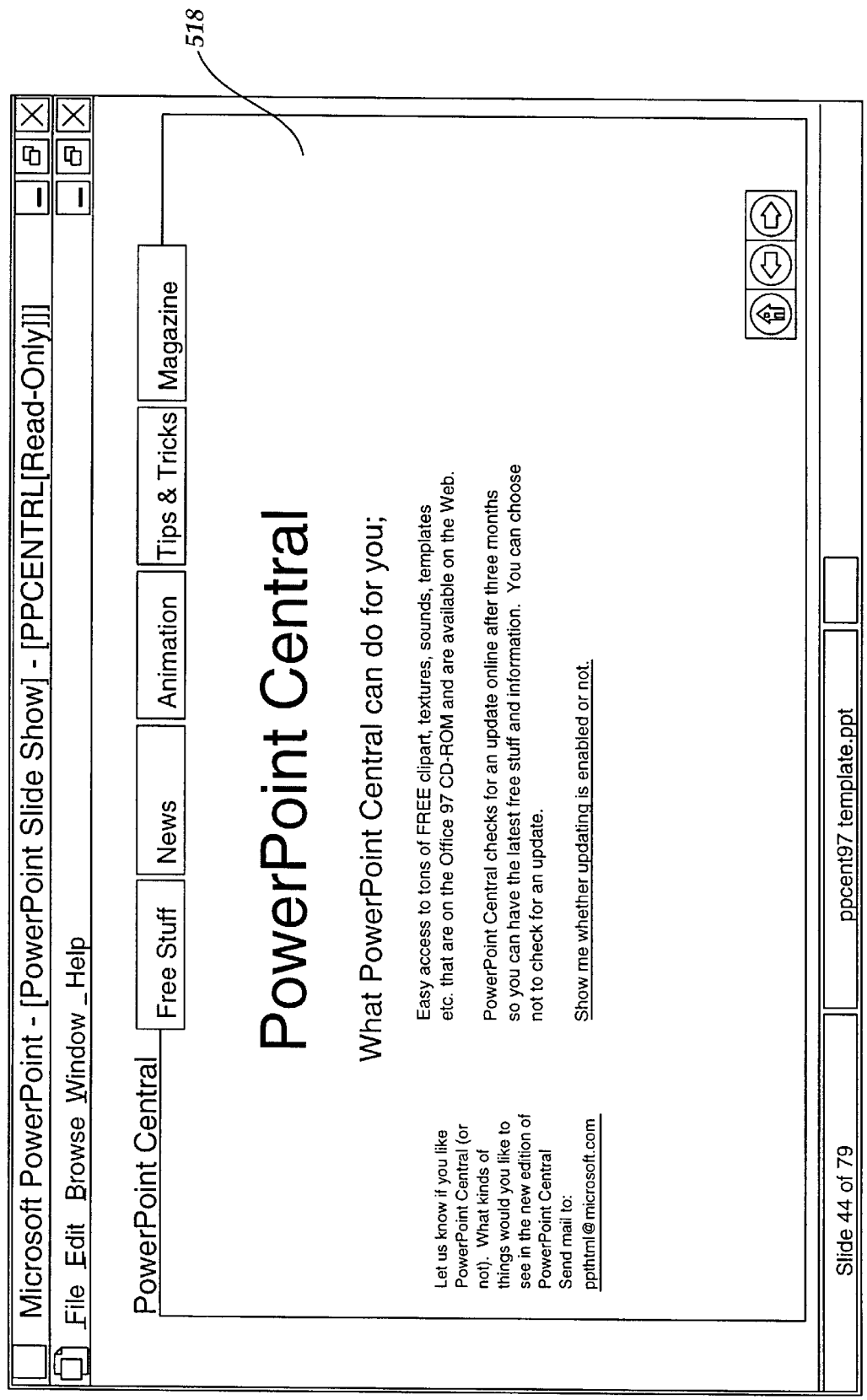
Figure 5C:
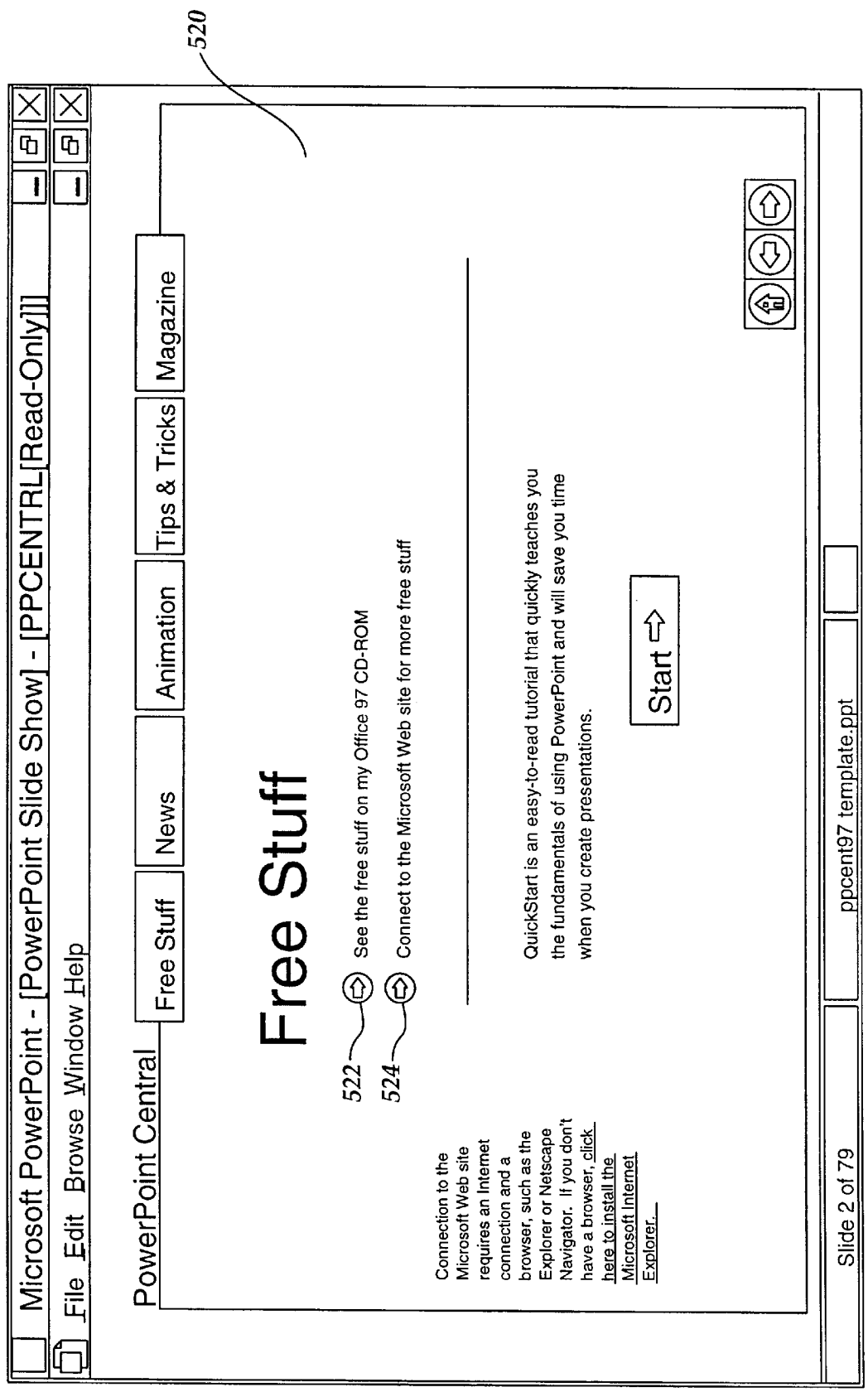

FIGS. 5A to 5C illustrate exemplary slides from one actual local PPCentral slide presentation file 214. The slides illustrate some of the information that can be provided utilizing the mechanism of the present invention. For example, in FIG. 5A, the initial slide 502 includes seven bullet items 504, 506, 508, 510, 512, 514, and 516 that have associated hyperlinks to additional slides. The slide 502 also displays text 517 indicating the date that the slide was updated. This may indicate the date that the slide was updated at the Web Site 222. Alternatively, it may indicate the date that the slide was most recently retrieved by the PPCentral update module. As depicted in FIG. 5A, the first bullet item 504 has an associated hyperlink to a slide providing information about the PowerPoint product. The second bullet item 506 has an associated hyperlink that explains the PowerPoint Central feature associated with the PowerPoint Central menu command in the Tools menu. The hyperlink associated with the second bullet in 506 causes slide 518, illustrated in FIG. 5B, to be displayed. As depicted in FIG. 5B, slide 518 contains information that explains the PowerPoint Central feature. The third bullet item 508 has an associated hyperlink that leads to a slide illustrating tools and objects available to a user. The tools and objects include sound objects, clip art, textures, photographs, and video clips. Selecting this hyperlink causes slide 520, illustrated in FIG. 5C to be displayed. As illustrated in FIG. 5C, slide 520 includes a first bullet item 522 having an associated link that shows a user objects that are included in the product CD-ROM. Item 524 has an associated hyperlink that connects to the Microsoft web site, where a user can obtain additional product information and product accessories.

The fourth bullet item 510 has an associated link that leads to a set of slides providing additional information on use of the product. The fifth bullet item 512 has an associated hyperlink to a set of slides that demonstrate features of the PowerPoint product. The sixth bullet item 514 and the seventh bullet item 516 have associated hyperlinks that lead to slide presentations having slide shows that may be of interest to a user. As will be recognized by those skilled in the art of slide presentations, and others, there is a wide variety of information that can be presented utilizing the mechanism of the present invention to present slides to a user. Since the remote PPCentral slide presentation file 224 (FIG. 2) can be easily updated, the mechanism of the invention allows one in control of the web site 222 to provide current information, accessories, and data to users.

While the preferred embodiment of the invention has been illustrated and described it will be appreciated that various changes can be made therein without departing from the spirit and scope of the invention.

The embodiments of the invention in which an exclusive property or privilege is claimed are defined as follows:

1. A system for providing resources for use by a slide presentation program, the system comprising:
    (a) a local computer having a slide presentation program executing thereon;
    (b) a local slide presentation file;
    (c) a computer network;
    (d) a remote computer connected to the computer network, the remote computer having a remote slide presentation file with associated resources; and
    (e) program code for performing actions, including:
        (i) determining when to update the local slide presentation file;
        (ii) when the determination to update the local slide presentation file is affirmative, selectively retrieving the remote slide presentation file from the remote computer; and
        (iii) when the remote slide presentation file is retrieved, automatically launching a slide presentation included in the remote slide presentation file, wherein the slide presentation includes at least one slide having at least one resource.

2. The system of claim 1, wherein the resource is embedded in the slide.

3. The system of claim 1, wherein the resource is linked to the slide.

4. The system of claim 2, wherein the resource is stored at another location separate from the remote computer.

5. A method for updating a version of a resource for a local program file that is associated with a slide presentation program, comprising:
    (a) when the slide presentation program is chosen to be launched, determining whether to update the version of the resource for the local program file to a current version of the resource;
    (b) when an affirmative determination to update the version of the resource for the local program file is provided, retrieving another program file that includes the current version of the resource; and
    (c) when the other program file is retrieved, automatically launching the slide presentation based on the current version of the resource for the other program file, wherein the slide presentation will include at least one slide that references the current version of the resource.

6. The method of claim 5, wherein the resource is embedded in the slide.

7. The method of claim 5, wherein the resource is linked to the slide.

8. The method of claim 5, wherein the current version of the resource for the other program file is stored at a remote computer.

9. The method of claim 5, wherein the current version of the resource for the other program file is stored at a local computer.

10. The method of claim 5, further comprising a network that couples a remote computer to a local computer that is associated with the local program file, the network including a local area network, wide area network and Internet.

* * * * *